(12) United States Patent
Staib

(10) Patent No.: US 8,727,414 B2
(45) Date of Patent: May 20, 2014

(54) STOWABLE CARGO COVER

(75) Inventor: Randy A. Staib, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/546,596

(22) Filed: Jul. 11, 2012

(65) Prior Publication Data

US 2014/0015270 A1    Jan. 16, 2014

(51) Int. Cl.
*B60R 5/04* (2006.01)
*B60P 7/14* (2006.01)

(52) U.S. Cl.
USPC ..................... 296/24.43; 296/37.16

(58) Field of Classification Search
USPC ................. 296/24.43, 37.1, 37.16, 37.15, 63; 224/539–543
See application file for complete search history.

(56) References Cited

U.S. PATENT DOCUMENTS

| | | |
|---|---|---|
| 4,671,557 A | 6/1987 | Lemp |
| 5,011,208 A | 4/1991 | Lewallen |
| 5,584,523 A | 12/1996 | Kawaguchi |
| 5,711,568 A | 1/1998 | Diem et al. |
| 5,727,836 A | 3/1998 | Hosoya |
| 5,947,358 A | 9/1999 | Wieczorek |
| 6,039,105 A | 3/2000 | Patmore |
| 6,616,389 B1 * | 9/2003 | Ament et al. ................. 410/118 |
| 6,702,355 B1 | 3/2004 | Price et al. |
| 7,988,392 B2 | 8/2011 | Aebker |
| 8,087,713 B2 | 1/2012 | Schrader et al. |

* cited by examiner

*Primary Examiner* — Glenn Dayoan
*Assistant Examiner* — Melissa A Black
(74) *Attorney, Agent, or Firm* — Fay Sharpe LLP

(57) ABSTRACT

A cargo cover assembly selectively covers a cargo compartment formed behind the rear seat and between spaced interior sidewalls vehicle. The cover assembly includes a housing pivotally connected to a rear seat and movable between storage and deployed positions. A cover, and preferably first and second cover portions, extend(s) in a lateral direction from the housing toward at least one of the interior sidewalls of the vehicle to a deployed position(s). Retaining members are formed in the sidewalls for securing the cover portions in the deployed positions. First and second rails may also be pivotally secured to the housing to receive perimeter portions of the respective cover portions and thereby add additional support and improving the aesthetics of the cover assembly.

17 Claims, 10 Drawing Sheets

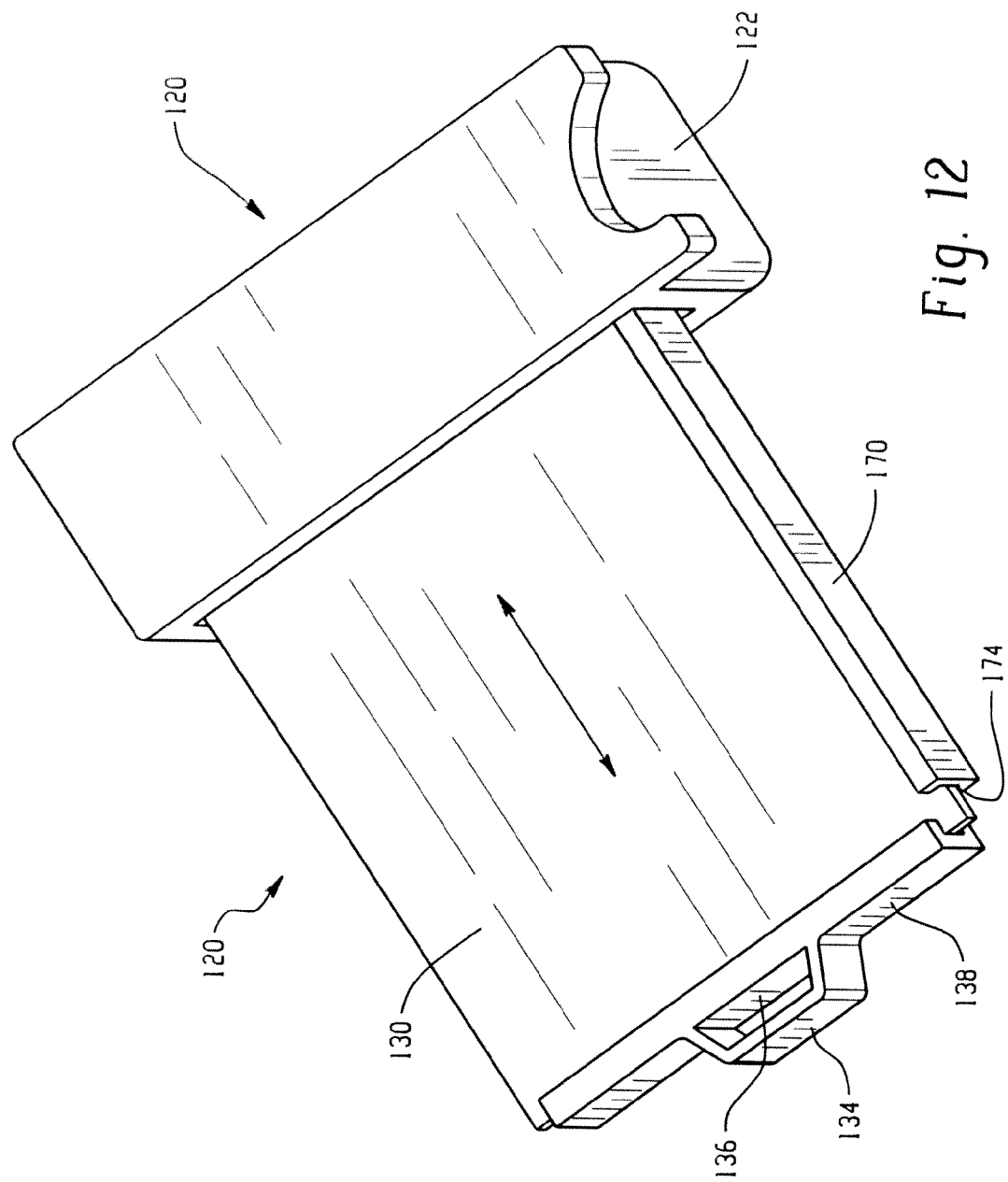

STOWABLE CARGO COVER

BACKGROUND

This disclosure relates to a vehicle cargo area, and more particularly to a cover assembly for the cargo area. The disclosure finds particular application in connection with storage of the cover assembly when not in use, and unique deployment of the cover assembly, and will be described with particular reference thereto. However, selected aspects of the present disclosure may find use in related environments and applications.

Rear cargo areas for SUV and hatchback vehicles typically have covers to hide the cargo or to give a clean appearance when cargo is stored in the vehicle. Often, the cargo area is not used for cargo and the cover is not necessary. Some covers are large and cannot be collapsed or folded to reduce the size when not in use. Others have spring actuated systems to roll up the cover to reduce the size. However, the roller covers are still large and difficult to store when not in use since the covers are typically as wide as the vehicle cargo area.

Most covers are usually in the way when not in use or need to be disassembled and stored elsewhere. Covers that are not removable often have a poor appearance when not in use. Some covers have designated storage areas within the vehicle. However, the customer is inconvenienced by needing to actually move the cover to another part of the vehicle. Sometimes damage occurs to the vehicle or the cover as a result of having to move the cover to the storage area. There is also the problem of storing the cover outside of the vehicle and occasionally leaving the cover behind when it is most desired.

It is common to locate the storage area behind the rear seat in the vehicle. Since the cargo area is relatively large, the spring actuated roller cover has perimeter edges that may sag under their own weight. Although the cover may effectively hide the contents in the cargo area, the sagging perimeter edges have an unsightly appearance. It also becomes necessary to hold or maintain the roller cover in storage and deployed positions.

Consequently, a need exists for a cover that hides cargo, provides a clean appearance, can be easily stored within the vehicle when not in use, and effectively maintains the deployed position.

SUMMARY

An improved cargo cover assembly for selectively covering a cargo compartment or area generally formed behind the rear seat and between spaced interior sidewalls of a vehicle includes a housing pivotally connected to the rear seat. The housing is movable between a storage position and a deployed position. A cover is operatively associated with the housing and selectively deployable in a lateral direction from the housing when the housing is in the deployed position so that the cover extends toward at least one of the interior sidewalls of the vehicle.

The housing is substantially parallel to a rear surface of the rear seat in the storage position and the housing is substantially perpendicular to the rear surface in the deployed position.

The cover assembly preferably includes first and second cover portions extending from opposite sides of the housing for extension and retraction toward and away from, respectively, respective interior sidewalls.

The cargo cover assembly may further include at least a first rail hinged to the housing for receiving a perimeter portion of the cover or cover portion when the first rail extends from the housing and the cover portion is in the deployed position.

The cover assembly has a retaining assembly for selectively securing the cover in the extended position.

The retaining assembly has a first portion along a perimeter portion of the cover and a second portion on at least one of the interior sidewalls.

The retaining assembly first portion includes a handle having a finger receiving opening where the opening is dimensioned for selective engagement with a retaining member operatively associated with one of the interior sidewalls.

The housing is preferably pivotally secured adjacent a first end to an upper region of the rear surface of the rear seat.

The housing is preferably secured at approximately midspan of the rear surface of the rear seat.

Cover includes first and second cover portions received on respective first and second rollers mounted in the housing.

A cover preferably includes a roller and a spring that urges the cover into rolled receipt on the roller.

A method of covering a vehicle cargo compartment or area defined behind a rear seat and between internal sidewalls of the vehicle includes providing a housing on a rear surface of the rear seat capable of moving between a storage position and a deployed position. The method further includes selectively deploying a cover from the housing in a lateral direction relative to the rear surface of the rear seat and into an extended position where the cover extends toward at least one of the interior sidewalls of the vehicle.

The deploying step includes extending first and second cover portions toward first and second interior sidewalls, respectively, of the vehicle.

The method includes pivoting the housing from a generally central mounting location in the rear seat where the housing is substantially flush with the rear surface of the rear seat to the deployed position extending substantially perpendicular to the rear surface of the rear seat and substantially parallel to a floor of the cargo area.

A primary benefit of the present disclosure is the provision of a cover that is easily stored in the vehicle.

Another advantage of the disclosure relates to the improved aesthetics of the cargo cover assembly.

Yet another feature is the ease of use.

Still another benefit is associated with the ability to integrate the cover assembly into back of the vehicle rear seat, so that no removal of the cargo cover assembly is required and the potential for damage to the cover assembly is limited.

Other benefits and advantages of the present disclosure will become apparent to those skilled in the art upon reading and understanding the following detailed description.

BRIEF DESCRIPTION OF THE DRAWINGS

FIG. 12 is an isometric view of one of the cover portions in the extended, deployed position and partially supported by the first rail.

DETAILED DESCRIPTION

Figure 1:
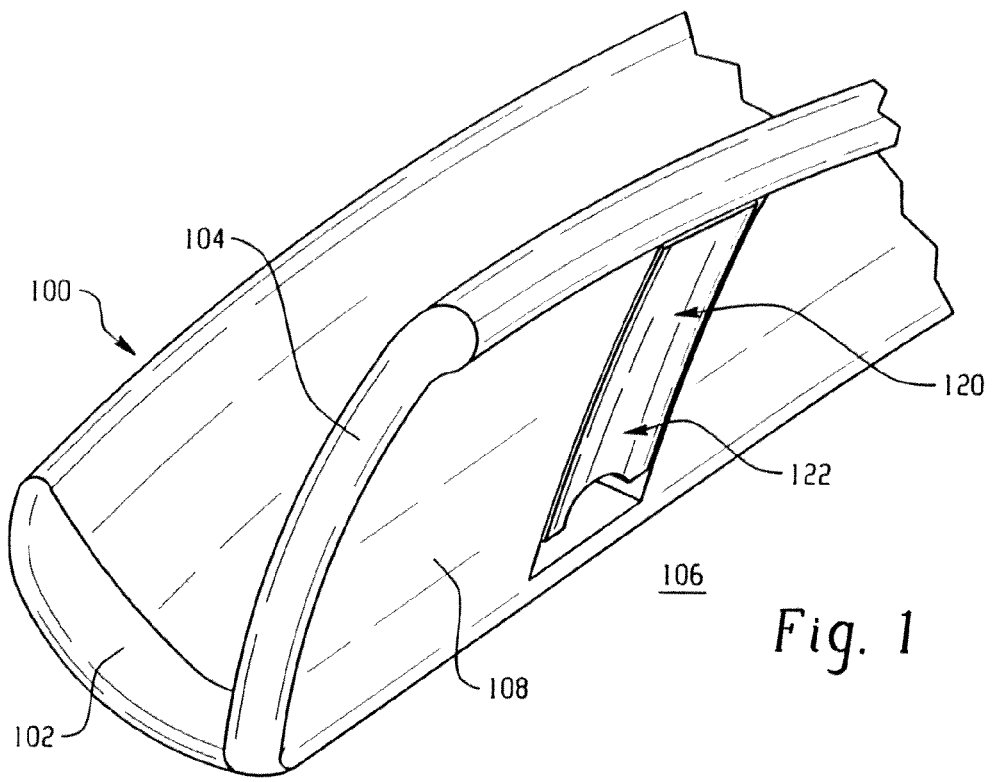
FIG. 1 is an isometric view of a back door rear surface of the vehicle rear seat showing a cover assembly in a storage position.

FIG. 1 shows a rear seat 100 generally depicted by a seat portion 102 and a seat back 104. It is recognized that in some vehicles the seat back 104, or one or more portions of the rear seat back, may be selectively folded downwardly onto the seat portion 102 in order to enhance a size of the cargo area 106 in the rear of the vehicle. The cargo area is generally defined rearwardly of a rear surface or back 108 of the rear seat back 104 and extending between first and second sidewalls 110, one of which is shown and will be described further with respect to FIGS. 4-7 below.

Figure 2:
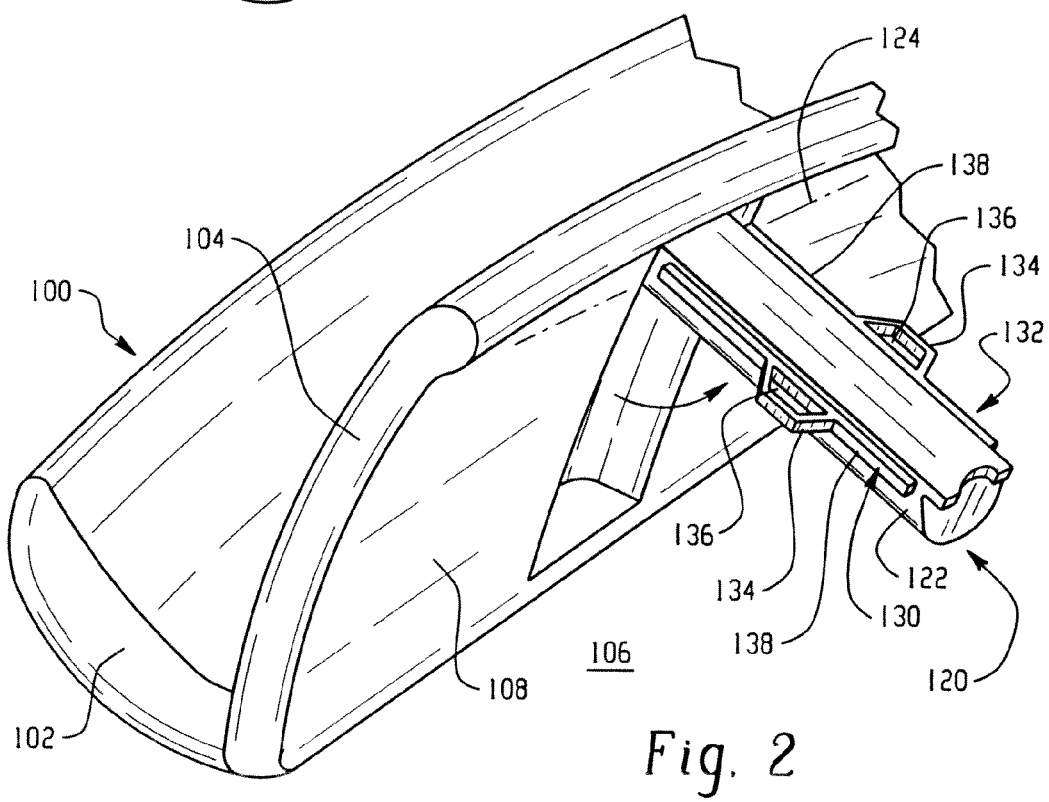
FIG. 2 is an isometric view similar to FIG. 1 with the cover assembly shown in a deployed position.
Figure 3:
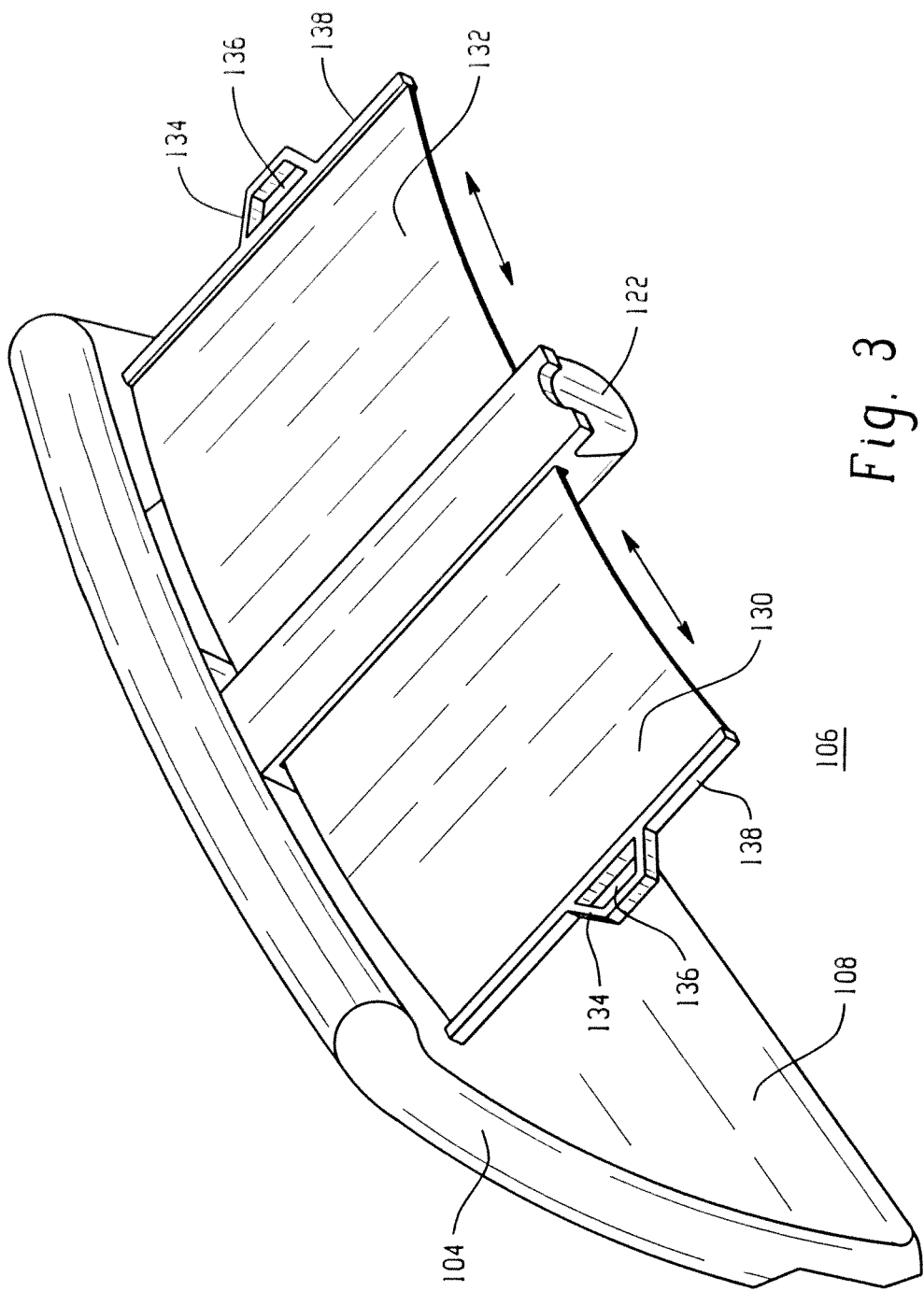
FIG. 3 is an isometric view similar to FIG. 2 with extended first and second cover portions.

Mounted in the rear surface 108 of the seat back 104 of the rear seat 100 is a cargo cover device or cover assembly 120. The cargo cover assembly 120 includes a housing 122 dimensioned to be preferably stored inside a recess formed or provided in the rear surface 108 of the rear seat back 104. Further, the housing 122 is preferably located in a central mounting location, e.g. generally equally spaced between the sidewalls, as depicted in FIGS. 1-3. The housing 122 is hingedly mounted along a pivot axis 124 preferably located near the top or upper portion of the seat back 104. A locking mechanism (not shown), of conventional structure and operation, is preferably located near a bottom or lower portion of the seat back 104 to keep the cover assembly housing 122 secured in a storage position shown in FIG. 1. In the storage position, the housing 122 preferably does not extend outwardly beyond the rear surface 108 of the seat back and thus maximizes the volume of the cargo area, and likewise protects the cargo cover assembly 120 from potential damage.

To use the cargo cover assembly 120, the housing 122 is first unlocked and then pivoted about axis 124 by pulling upwardly on a lower portion of the housing remotely located from the axis 124, and thereby rotating the housing upwardly and toward the rear of the vehicle as represented in FIG. 2. When the housing 122 reaches a position substantially parallel to a floor of the cargo area 106, a conventional locking mechanism (not shown) holds the housing in a deployed position (FIG. 2).

Preferably, the cargo cover assembly 120 includes first and second cover portions 130, 132. Each cover portion 130, 132 in the illustrated embodiment is substantially identical to the other cover portion so that illustration and description of one is applicable to the other cover portion unless particularly noted otherwise. Each cover portion 130, 132 includes a handle 134 that has a finger receiving opening 136. The handle 134 is formed of a generally rigid material such as a sturdy plastic or composite material, and preferably the handle is part of an elongated, rigid edge member 138 secured along a terminal end of a respective flexible cover portion 130 or 132. The handle 134 is contoured so that the handle can be easily grasped and thereby extends the respective flexible cover portion 130, 132 from a storage position where the cover portion is protected in the housing (FIG. 2), e.g. stored in housing 122 such as on a spring actuated roller, to an extended or deployed position (FIG. 3) where the cover portions are deployed laterally outward from opposite sides of the housing behind the rear seat and toward respective sidewalls 110.

Figure 6:
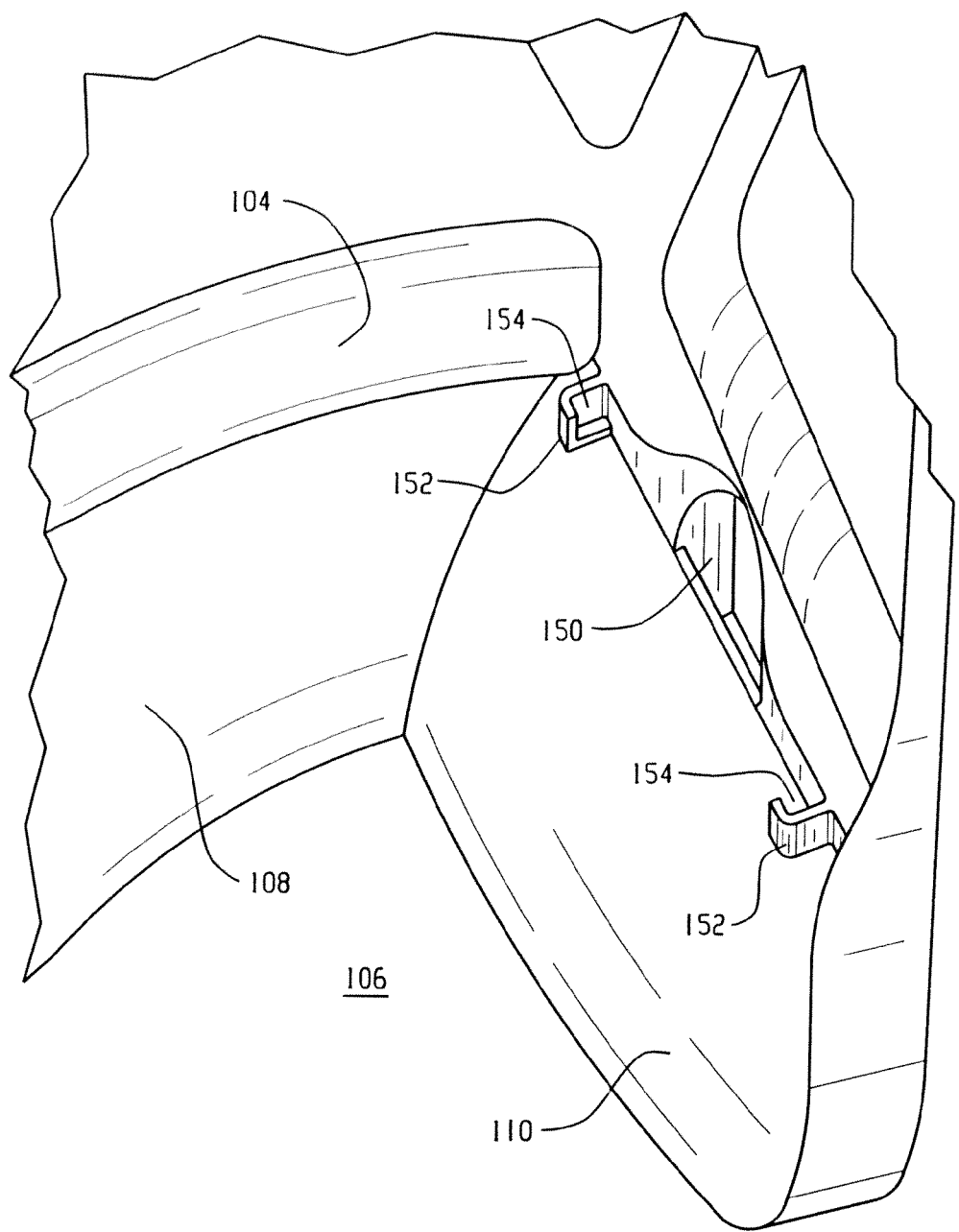
FIG. 6 shows the retention assembly of FIGS. 4 and 5 without the cover.
Figure 7B:
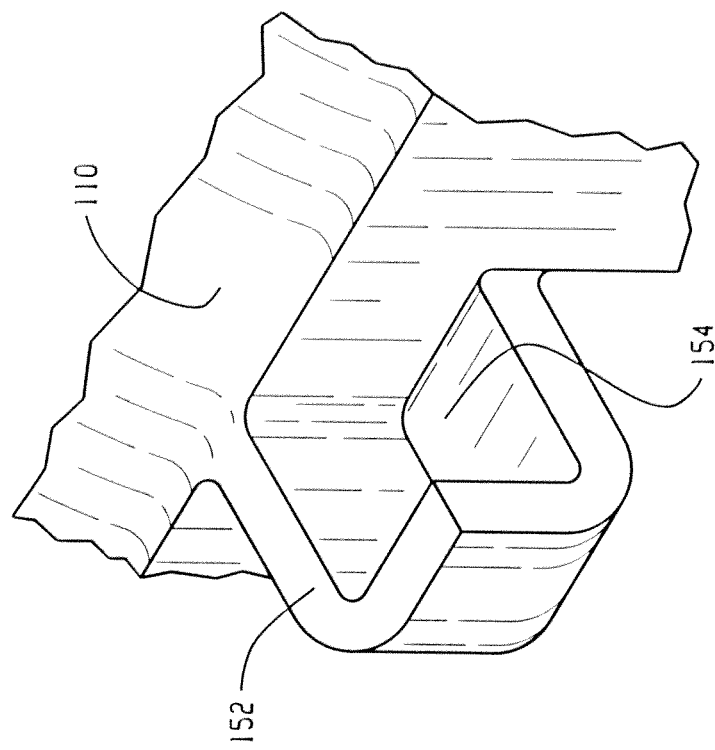
FIGS. 7A and 7B are enlarged detail views of a preferred retention assembly.
Figure 7A:
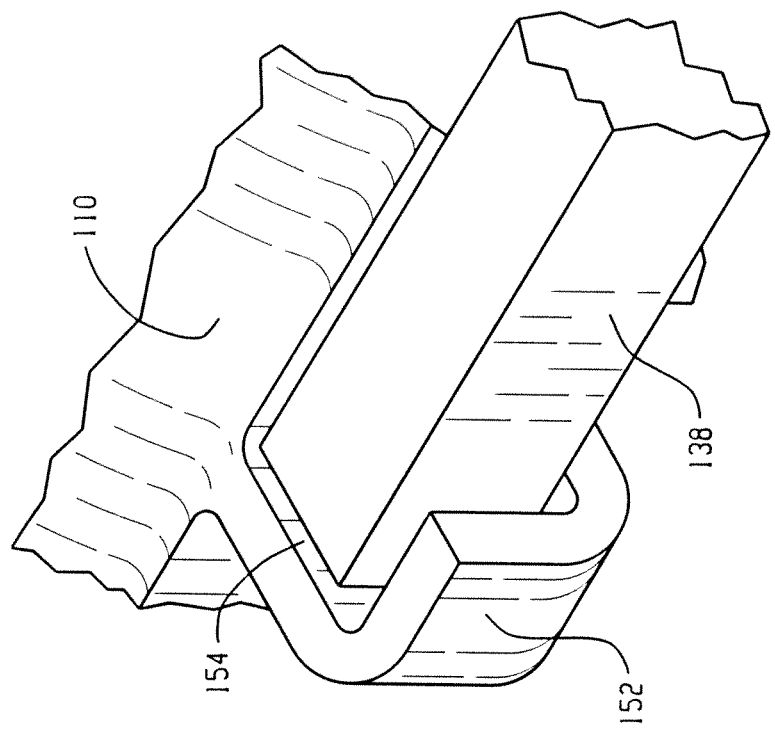

A recess 150 is preferably provided in each of the sidewalls 110 to accommodate the handle 134 of the cargo cover assembly. In addition, each of the sidewalls 110 includes a retention member(s) 152 that receives the cover portion, and more particularly receives the edge member 138 to retain the cover portion in the deployed position. As perhaps best illustrated in FIGS. 4-6, 7A, and 7B, one preferred form of a retention member 152 includes a recess 154 having a depth and width that closely approximates the corresponding height and width of the edge member 138 so that the edge member is received in the recess 154 and held in the deployed position against the biasing force of the spring associated with the roller device that urges the cover portion into the housing 122. As shown in FIG. 6, the retention members 152 may be provided in spaced relation relative to the recess 150 in order to receive opposite ends of the edge member 138.

Figure 8B:
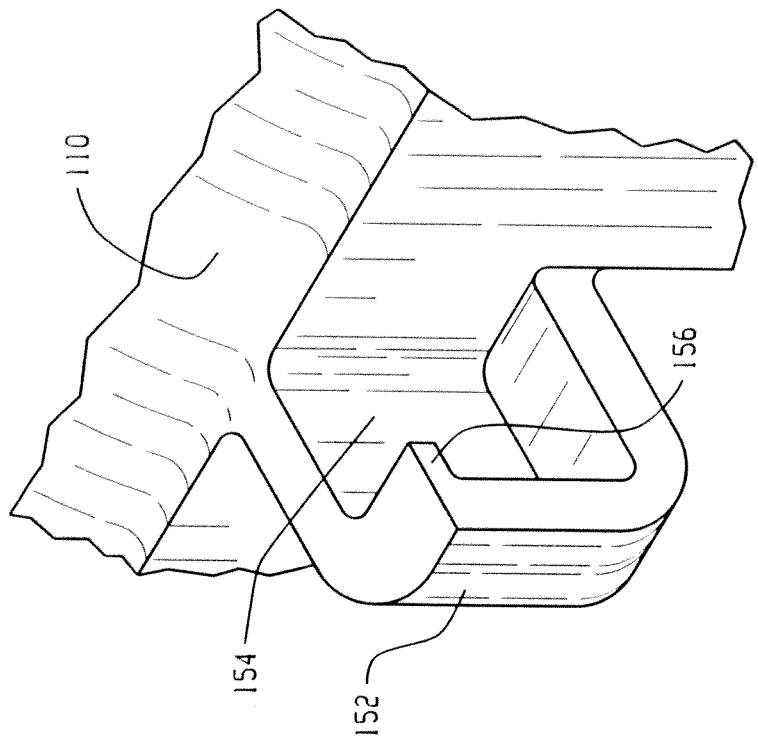
FIGS. 8A and 8B are enlarged detail views of a second preferred retention assembly.
Figure 8A:
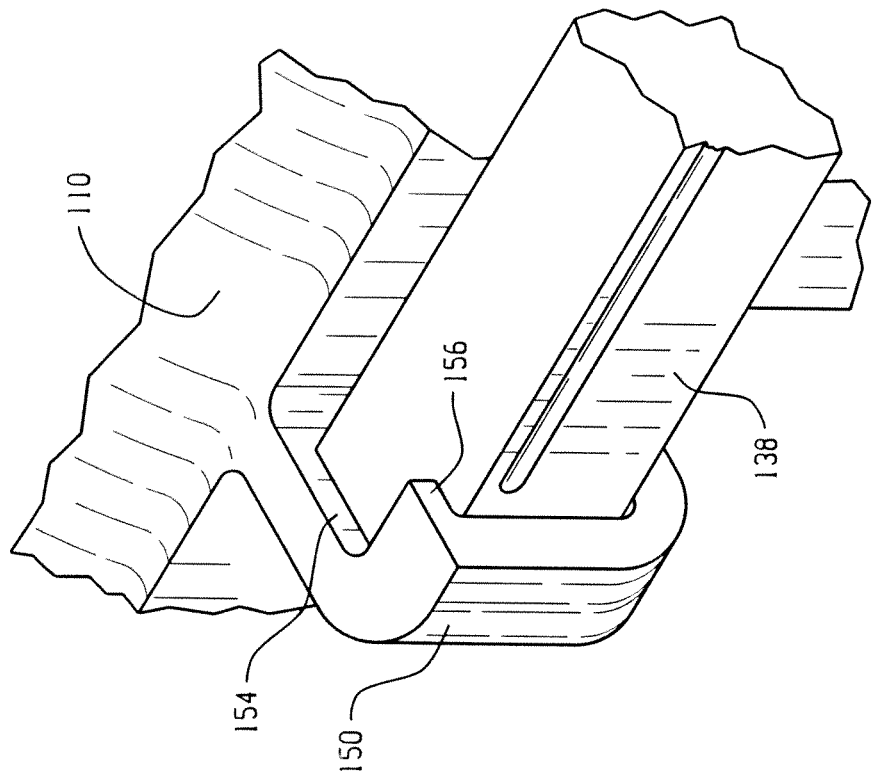
Figure 9:
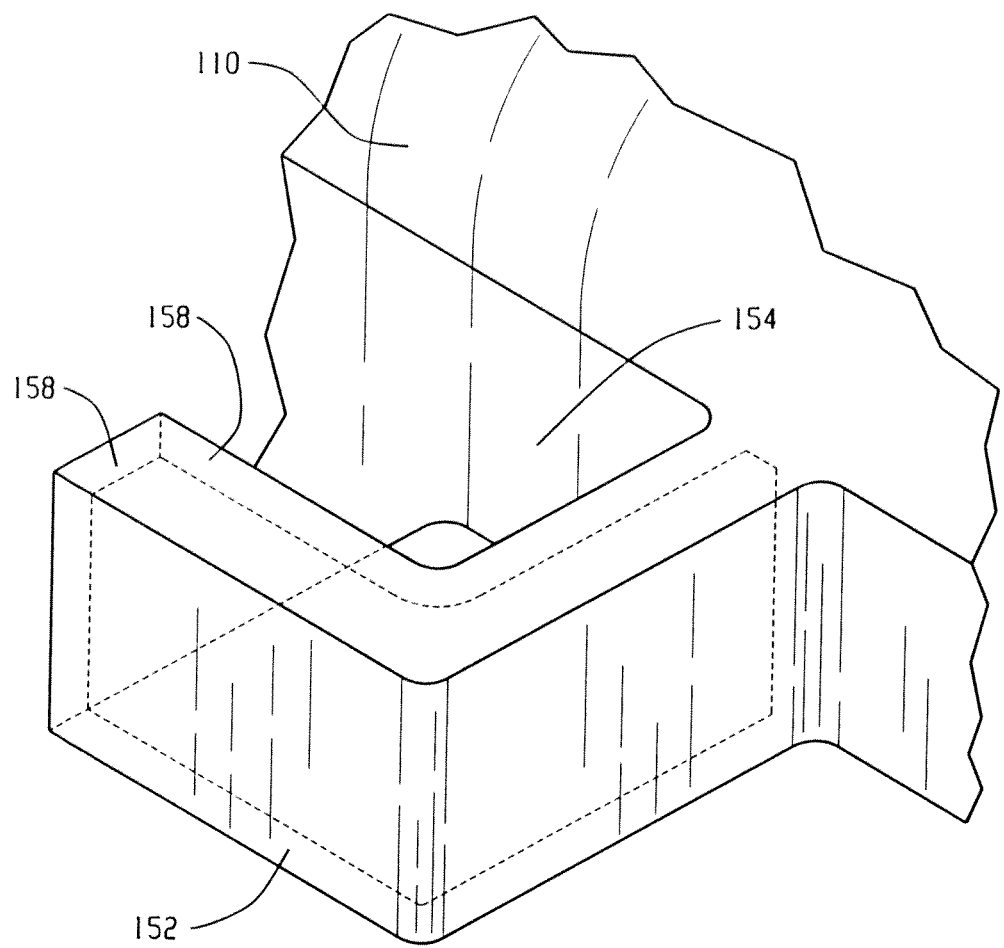
FIG. 9 is an enlarged detail view of a third preferred retention assembly.

A slightly modified contour of the retention members 152 are shown in FIGS. 8A and 8B. Here, a retaining lip 156 is added to each of the retention member and the retaining lip provides enhanced, positive engagement with the edge member 138 of a respective cover portion 130, 132 when the edge member is received therein. FIG. 9 illustrates yet another modified contour of the retention member 152 where retaining lip 158 extends along both lateral and longitudinal upper edges of at least one of the retention members to again provide enhanced, positive engagement and limit the potential for inadvertent removal of the cover portion 130, 132 from the deployed position. Of course other configurations may be used for retaining the cover portion in the deployed position and without departing from the scope and intent of the present disclosure.

Figure 11:
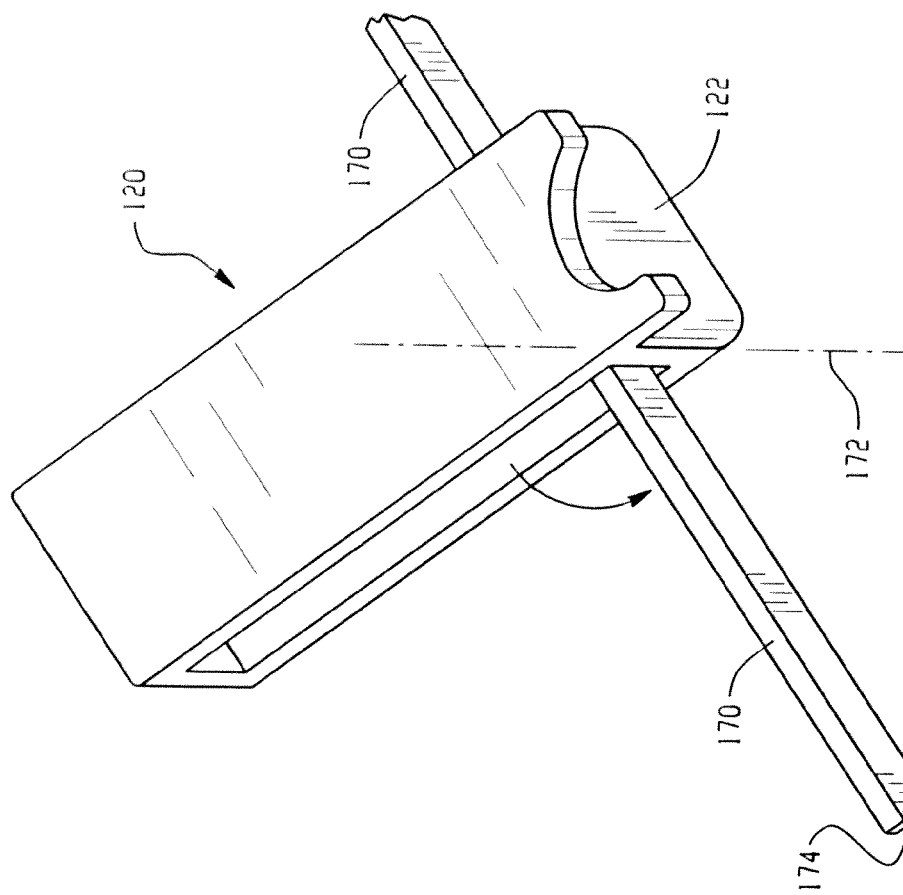
FIG. 11 shows movement of first and second rails to extended, support positions.
Figure 10:
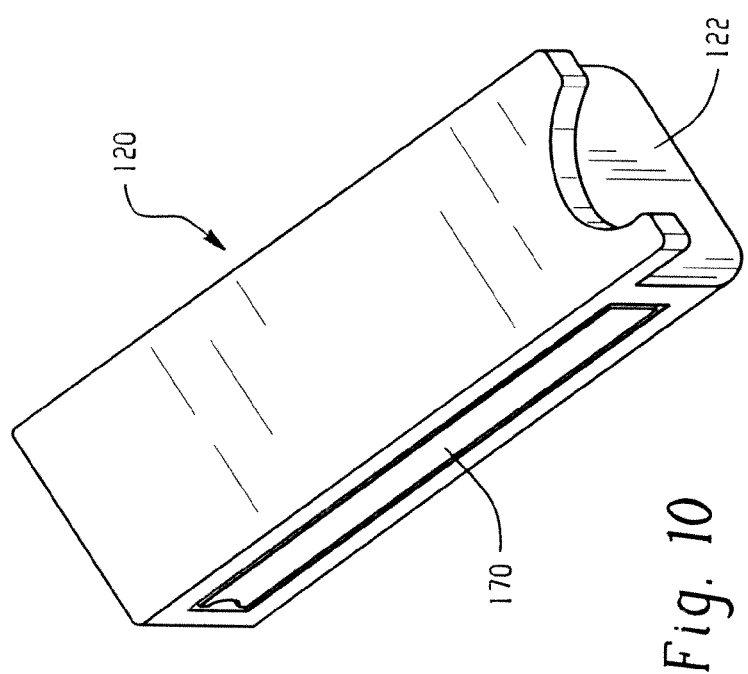
FIG. 10 illustrates a modification or second preferred embodiment of a cover assembly.

FIGS. 10-12 illustrate another feature for enhancing the support portions and the aesthetics of the cargo cover assembly. More particularly, a rail 170 is pivotally connected to the housing 122. A rail(s) 170 is shown in a storage position in FIG. 10, and in a deployed position in FIGS. 11 and 12 after the rail has been rotated about axis 172. When deployed, the rails 170 extend generally perpendicular relative to the housing 122. Preferably each rail includes a recess or track 174 dimensioned and configured to receive a perimeter edge region of a respective cover portion 130, 132 when the cover portion is in a deployed position. The rail provides for perimeter edge support and prevents the cover portion from sagging when in the deployed position. One skilled in the art will appreciate that the rails 170 also add to the aesthetics of the cargo cover assembly 120 when the cover or cover portion is in the deployed position.

The cargo cover assembly of the present disclosure has the capability to be advantageously stored inside the back of the rear seat. The cover assembly has a central, longitudinal mounting location in the rear of the vehicle. Instead of extending the cover in one direction to conceal the cargo area (which could still be possible by mounting the housing at one edge of the back of the rear seat), the preferred form of the cover assembly has two separate cover portions each extending outwardly from a central portion of the vehicle toward or to a respective sidewall of the vehicle. The longitudinal mounting and dual cover portion arrangement reduces the length and overall size of the cargo cover assembly, and also reduces the span over which each cover portion must extend.

Figure 4:
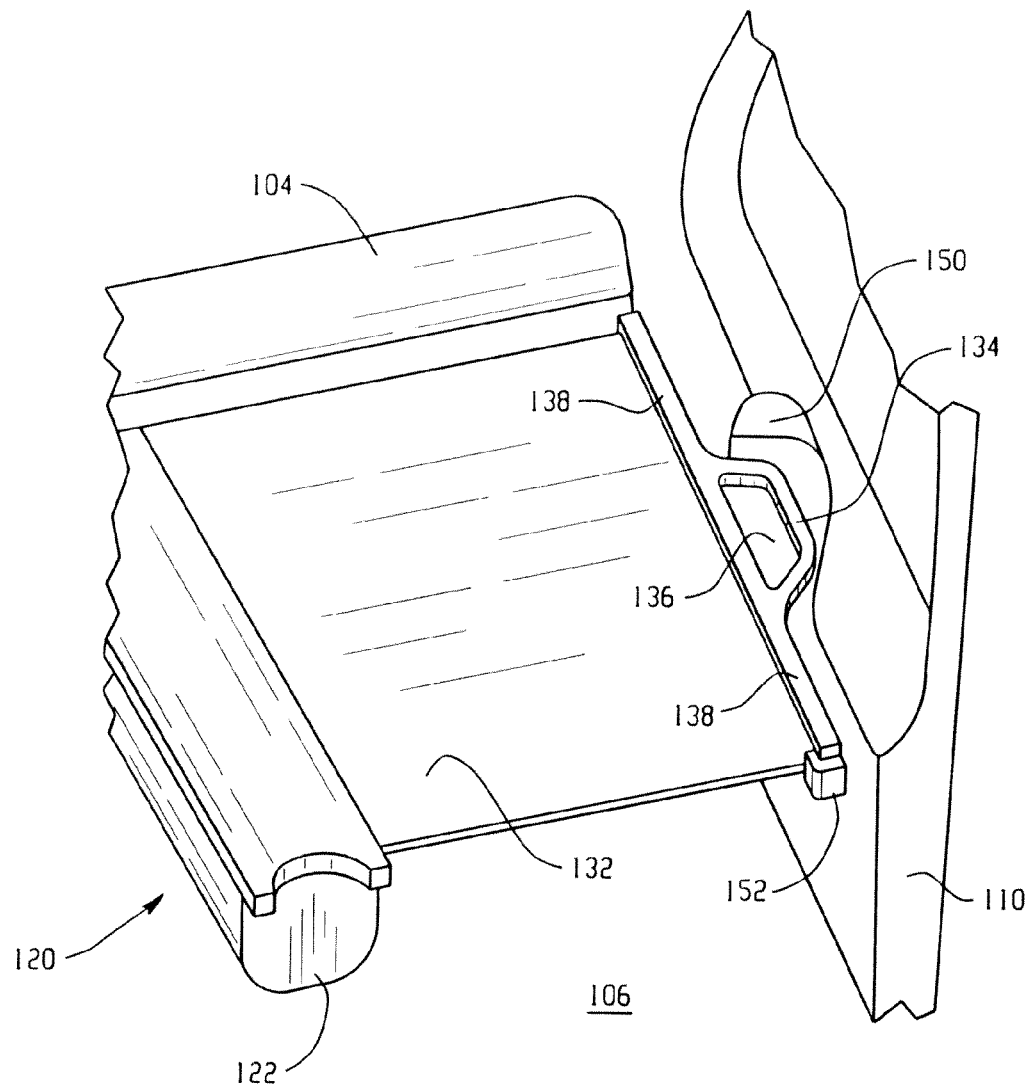
FIG. 4 is an isometric view illustrating securing one of the cover portions in the deployed position.
Figure 5:
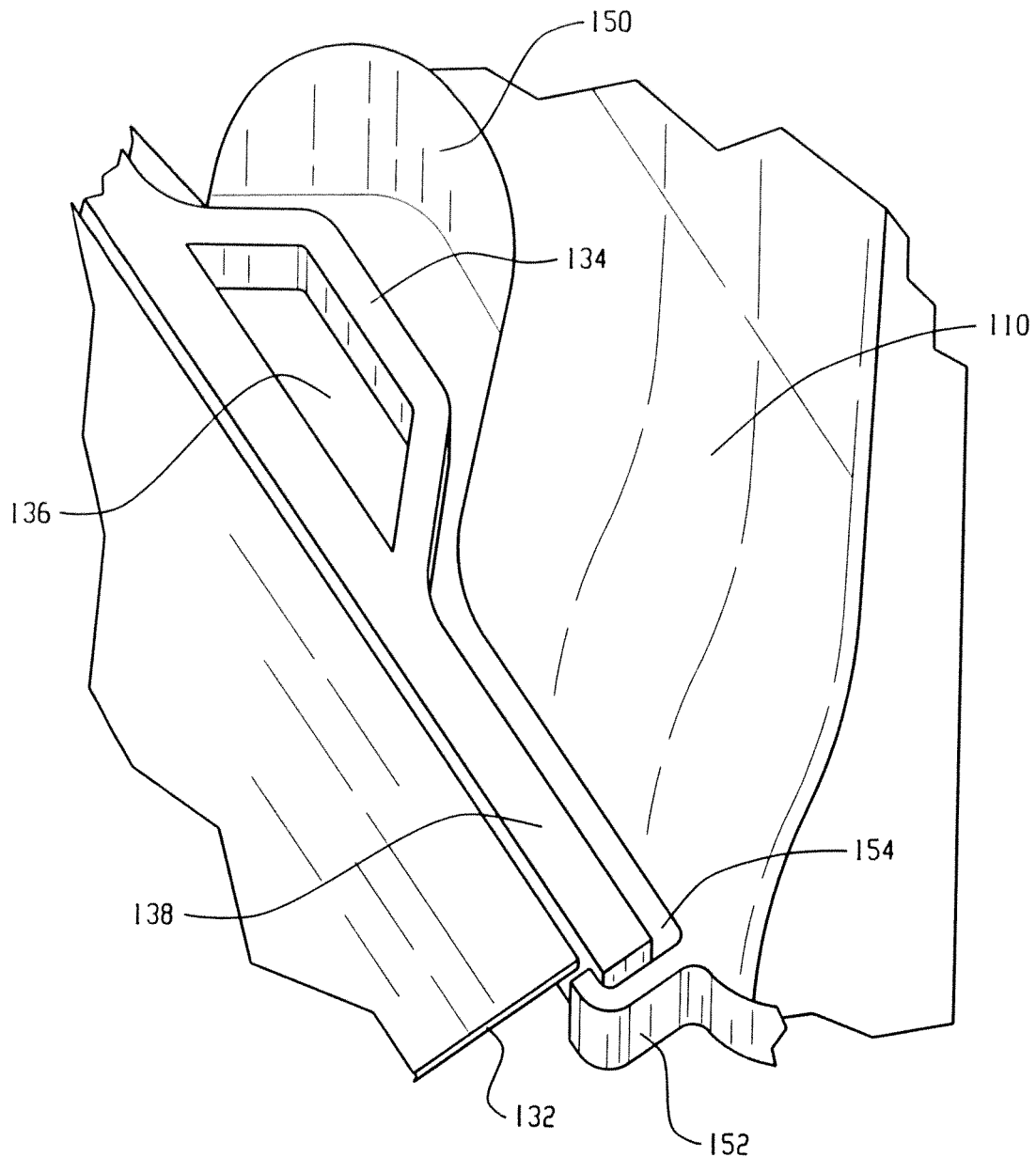
FIG. 5 is an enlarged view of a retention assembly of FIG. 4.

When in the stored position, the cargo cover assembly is mounted inside the back of the rear seat (FIG. 1). The assembly is mounted to a pivot axis near a top of the seat back, and has a locking mechanism in the bottom of the seat to keep the assembly secured in the stored position. The operator pulls upwardly on the housing from near the bottom of the sleeve, rotating the cover assembly upwardly and the distal end of the housing toward the rear the vehicle (FIG. 2). At a position substantially parallel to the floor of the cargo area, the housing is locked in a deployed position. Two separate cover portions each preferably has its own spring coil system that allows the cover portions to be easily unrolled and effectively cover the cargo area, or retracted and maintained stored in the housing. The handle on each cover portion allows the user to pull the cover portion and extend the cover portion toward a respective sidewall of the vehicle (FIG. 3). On each sidewall of the vehicle, the handle is received in a corresponding recess and a retention member secures the cover to the sidewall (FIG. 4). The assembly can be equipped with additional cover support rails (FIG. 11) that are preferably mounted inside on both sides of the cover assembly housing. Each rail is pivoted outwardly and allows the operator to rotate the respective rail generally horizontally toward the rear of the vehicle until the rail reaches a position substantially perpendicular to the housing of the cover assembly. The perimeters of the cover portions mount to and ride along inside a track or recess in the rails as the cover portions extend outwardly to the sidewall of the vehicle. This provides additional vertical support for the cover portions to prevent sagging of the cover when extended to the respective sidewall.

The disclosure has been described with reference to the preferred embodiments. Obviously, modifications and alterations apparent to those of ordinary skill upon reading and understanding the specification. For example, different preferred materials construction may be used. The disclosure is intended to include such modifications and alterations in so far as they fall within the scope of the claims of the present application.

What is claimed is:

1. A cargo cover assembly for selectively covering a cargo compartment generally formed behind a rear seat and between spaced interior sidewalls of a vehicle, the cargo cover assembly comprising:
   a housing pivotally connected to a rear seat and movable between a storage position and a deployed position, wherein the housing in the storage position is substantially parallel to a rear surface of the rear seat, and the housing is substantially perpendicular to the rear surface in the deployed position;
   a cover operatively associated with the housing and selectively deployable in a lateral direction from the housing, when the housing is in the deployed position, between a first, storage position and a second, extended position wherein the cover extends toward at least one of the interior sidewalls of the vehicle.

2. The cargo cover assembly of claim 1 wherein the cover includes first and second cover portions extending from opposite sides of the housing for extension and retraction toward and away, respectively, from respective interior sidewalls.

3. The cargo cover assembly of claim 1 further comprising at least a first rail hinged to the housing for receiving a perimeter portion of the cover when the rail extends from the housing and the cover is in the deployed position.

4. The cargo cover assembly of claim 1 further comprising a retaining assembly for selectively securing the cover in the extended position.

5. The cargo cover assembly of claim 4 wherein the retaining assembly has a first portion along a perimeter portion of the cover and a second portion on at least one of the interior sidewalls.

6. The cargo cover assembly of claim 5 wherein the retaining assembly first portion includes a handle having a finger receiving opening and the second portion includes a retaining member extending from one of the interior sidewalls that selectively operatively engages a perimeter edge member on the cover in the deployed position of the cover.

7. The cargo cover assembly of claim 1 wherein the housing has an elongated dimension and is pivotally secured adjacent a first end to an upper region of the rear surface of the rear seat.

8. The cargo cover assembly of claim assembly 1 wherein the housing is mounted at approximately mid-span of the rear surface of the rear seat.

9. The cargo cover assembly of claim 8 wherein the cover includes first and second cover portions received on respective first and second rollers mounted in the housing.

10. The cargo cover assembly of claim 1 wherein the cover includes a roller receiving the cover thereover, and a spring urging the cover into rolled receipt on the roller.

11. A cover assembly for a vehicle cargo compartment formed behind a rear seat and interior sidewalls, the cover assembly comprising:
    a housing connected to a rear seat, wherein the housing is pivotally secured to the rear seat for selective movement between a first, storage position stored in a recess of the rear surface of the rear seat, and a second, operative position extending rearwardly of the rear surface of the rear seat;
    a first cover portion operatively associated with the housing and selectively deployable between a first, storage position and a second, extended position; and
    a second cover portion operatively associated with the housing and selectively deployable between a first, storage position and a second, extended position.

12. The cover assembly of claim 11 wherein the first and second cover portions extend selectively outwardly from opposite sides of the housing in the second, operative position of the housing.

13. The cover assembly of claim 11 further comprising first and second rails hingedly mounted to the housing for selective deployment outwardly therefrom when the housing is in the second operative position, the first and second rails receiving perimeter portions of the first and second cover portions when in the extended positions.

14. The cover assembly of claim 11 further comprising a roller receiving the cover portions thereover, and a spring urging the cover portions into rolled receipt on the roller.

15. The cover assembly of claim 11 further comprising a retaining assembly for maintaining the first and second cover portions in the extended positions.

16. A method of covering a vehicle cargo compartment defined by a rear seat and between internal sidewalls, the method comprising:
    providing a housing on a rear surface of a rear seat capable of moving between a storage position and a deployed position;
    pivoting the housing from a generally central mounting location in the rear seat where the housing is substantially flush with the rear surface of the rear seat to the deployed position extending substantially perpendicular to the rear surface and substantially parallel to a cargo compartment floor; and selectively deploying a cover from the housing in a direction lateral to the rear surface of the rear seat and to an extended position wherein the cover extends toward at least one of the interior sidewalls of the vehicle.

17. The method of claim 16 further wherein the deploying step includes extending first and second cover portions toward first and second interior sidewalls, respectively, of the vehicle.

* * * * *